(12) United States Patent
Ding

(10) Patent No.: US 8,509,553 B2
(45) Date of Patent: Aug. 13, 2013

(54) DPCM-BASED ENCODER, DECODER, ENCODING METHOD AND DECODING METHOD

(75) Inventor: Jiun-Ren Ding, Kaohsiung County (TW)

(73) Assignee: Industrial Technology Research Institute, Hsinchu (TW)

( * ) Notice: Subject to any disclaimer, the term of this patent is extended or adjusted under 35 U.S.C. 154(b) by 1060 days.

(21) Appl. No.: 12/490,796

(22) Filed: Jun. 24, 2009

(65) Prior Publication Data

US 2010/0172582 A1 Jul. 8, 2010

(30) Foreign Application Priority Data

Jan. 7, 2009 (TW) .............................. 98100421 A

(51) Int. Cl.
*G06K 9/36* (2006.01)
*G06K 9/46* (2006.01)

(52) U.S. Cl.
USPC ............................ 382/238; 382/233; 382/244

(58) Field of Classification Search
USPC .................... 382/233, 238, 244, 248
See application file for complete search history.

(56) References Cited

U.S. PATENT DOCUMENTS

| | | | |
|---|---|---|---|
| 5,157,488 A * | 10/1992 | Pennebaker | 375/240.04 |
| 5,467,086 A * | 11/1995 | Jeong | 341/50 |
| 5,708,511 A | 1/1998 | Gandhi et al. | |
| 5,777,680 A * | 7/1998 | Kim | 375/240.04 |
| 6,330,370 B2 * | 12/2001 | Goyal et al. | 382/251 |
| 6,785,422 B2 | 8/2004 | Bossen | |
| 7,227,900 B2 | 6/2007 | Porter et al. | |
| 7,277,587 B2 | 10/2007 | Sun | |
| 7,352,811 B2 | 4/2008 | Stone et al. | |
| 7,446,771 B2 | 11/2008 | Kim et al. | |
| 2003/0103573 A1* | 6/2003 | Woo et al. | 375/245 |
| 2003/0156643 A1* | 8/2003 | Song | 375/240.03 |
| 2005/0232501 A1* | 10/2005 | Mukerjee | 382/239 |

(Continued)

FOREIGN PATENT DOCUMENTS

| | | |
|---|---|---|
| CN | 1684495 | 10/2005 |
| CN | 101167367 | 4/2008 |

(Continued)

OTHER PUBLICATIONS

Kim et al. ("Animation data compression in MPEG4: Interpolators," IEEE ICIP 2002).*

(Continued)

*Primary Examiner* — Yubin Hung
(74) *Attorney, Agent, or Firm* — McClure, Qualey & Rodack, LLP

(57) ABSTRACT

An encoder, a decoder, an encoding method and a decoding method are provided. The encoder includes a reversible color transform module, a difference pulse code modulation (DPCM) intra prediction module, a quantization module, a reversible frequency transform module and an entropy coding module. The reversible color transform module performs a reversible color transform to output a transformed video signal according to an input video signal. The DPCM intra prediction module performs a DPCM intra prediction to output a least residual according to the transformed video signal. The quantization module performs a quantization operation to output a quantization coefficient according to the least residual. The reversible frequency transform module performs a reversible frequency transform to output a frequency coefficient according to the quantization coefficient. The entropy coding module performs entropy coding to output a compression bit stream according to the frequency coefficient.

23 Claims, 10 Drawing Sheets

(56) References Cited

U.S. PATENT DOCUMENTS

| | | | |
|---|---|---|---|
| 2006/0143002 A1* | 6/2006 | Ojanpera | 704/207 |
| 2008/0219576 A1* | 9/2008 | Jung et al. | 382/238 |
| 2009/0290045 A1* | 11/2009 | Fukuda et al. | 348/231.99 |

FOREIGN PATENT DOCUMENTS

| | | | |
|---|---|---|---|
| EP | 0734174 | | 9/1996 |
| EP | 1589769 | | 10/2005 |
| EP | 1845731 A1 * | | 10/2007 |
| JP | 8274648 | | 10/1996 |
| JP | 2005130517 | | 5/2005 |
| JP | 2005333622 | | 12/2005 |
| RU | 2005111002 | | 10/2006 |
| TW | 367661 | | 8/1999 |
| TW | 545061 | | 1/2002 |
| TW | I249290 | | 2/2006 |
| WO | 2006114718 | | 11/2006 |
| WO | 2007139266 | | 12/2007 |
| WO | WO 2007139266 A1 * | | 12/2007 |

OTHER PUBLICATIONS

Taiwanese language office action dated May 29, 2012.
English language translation of abstract of TW 367661 (published Aug. 21, 1999).
English language translation of abstract of TW 545061 (published Jan. 25, 2002).
English abstract of RU2005111002.
English abstract of JP8274648.
English abstract of TW I249290.
English abstract of CN101167367.
English abstract of CN1684495.
English abstract of JP2005130517.
English abstract of JP2005333622.
"HD Photo: Photographic Still Image File Format" Microsoft Corporation, 2006.
"Digital Compression and Coding of Continuous-Tone Still Images—Extensions" Annex F of ITU-T Recommendation T.84| ISO/IEC IS 10918-3, 1997.
"The LOCO-I Lossless Image Compression Algorithm: Principles and Standardization into JPEG-LS" Marcello J. Weinberger et al.; IEEE Transactions on Image Processing, vol. 9, No. 8, Aug. 2000.
"Advanced Image Coding" www.bilsen.com/aic, (Web downloaded Jun. 23, 2009.).
"Overview of the H.264/AVC Video Coding Standard" Thomas Wiegand, et al.; IEEE Transactions on Circuits and Systems for Video Technology, vol. 13, No. 7, Jul. 2003.
"Joint Scalable Video Model JSVM-7" Julien Reichel; Joint Video Team (JVT)of ISO/IEC MPEG & ITU-T VCEG (ISO/IEC JTC1/SC29/WG11 andITU-T SG16 Q.6); 20th Meeting: Klagenfurt, Austria, Jul. 15-21, 2006.
"Series H: AudioVisual and Multimedia Systems: Infrastructure of audiovisual services—Coding of moving video: Advanced video coding for generic audiovisual services" International Telecommunication Union, ITU-T Telecommunication Standardization Sector of ITU; H.264 (Mar. 2005).
"A New Lossless-DCT for Unified Lossless/Lossy Image Coding" Somchart Chokchaitam et al.; The 47th IEEE International Midwest Symposium on Circuits and Systems; 2004.
"JPEG 2000 Part 1 Final Committee Draft Version 1.0" ISO/IEC JTC 1/SC 29/WG 1 JPEG 2000 (ITU-T SG8); Coding of Still Pictures.
"A Lossless H.263 Video Codec Using the Reversible DCT" Sami Gharbi et al.; IEEE 2004.
"Comparison Between H.264/AVC and JPEG2000 Arithmetic Encoders" Ottavio Campana et al.; ICASSP 2007.
"Two-Layer Adaptive Entropy Coding Algorithms for H.264-based Lossless Image Coding" Jun-Ren Ding et al.; Institute of Computer and Communication Engineering, Department of Electrical Engineering, National Cheng Kung University, Tainan, Taiwan, ICASSP 2008.
"Improved Lossless Intra Coding for H.264/MPEG-4 AVC" Yung-Lyul Lee et al.; IEEE Transactions on Image Processing, vol. 15, No. 9, Sep. 2006.
"Interger Reversible Transformation to Make JPEG Lossless" Ying Chen et al.; ICSP'04 Proceedings, 2004.
"H.264 and MPEG-4 Video Compression: Video Coding for Next-generation Multimedia" Iain E G. Richardson, The Robert Gordon University, Aberdeen, UK, 2003.

* cited by examiner

Mode 0 (Vertical)

FIG. 3 (Prior Art)

Mode 1 (Horizontal)

FIG. 4 (Prior Art)

Mode 2 (DC)

| M-a | A-b | B-c | C-d |
|-----|-----|-----|-----|
| I-e | a'-f | b'-g | c'-h |
| J-i | e'-j | f'-k | g'-l |
| K-m | i'-n | j'-o | k'-p |

FIG. 16

| 76 | 76 | 76 | 76 | 76 | 76 | 76 | 76 | 76 |
|----|----|----|----|----|----|----|----|----|
| 76 | 78 | 78 | 76 | 50 | | | | |
| 76 | 78 | 77 | 50 | 50 | | | | |
| 76 | 76 | 50 | 50 | 50 | | | | |
| 76 | 50 | 50 | 50 | 50 | | | | |

FIG. 17

| 76 | 76 | 76 | 76 | 76 | 76 | 76 | 76 | 76 |
|----|----|----|----|----|----|----|----|----|
| 76 | -2 | -2 | 0 | 26 | | | | |
| 76 | -2 | -1 | 26 | 26 | | | | |
| 76 | 0 | 26 | 26 | 26 | | | | |
| 76 | 26 | 26 | 26 | 26 | | | | |

FIG. 18

| 76 | 76 | 76 | 76 | 76 | 76 | 76 | 76 | 76 |
|----|----|----|----|----|----|----|----|----|
| 76 | -2 | -2 | 0 | 26 | | | | |
| 76 | -2 | -1 | 26 | 2 | | | | |
| 76 | 0 | 26 | 2 | 2 | | | | |
| 76 | 26 | 2 | 2 | 2 | | | | |

FIG. 19

| Lossless compression 512*512 768kB | JPEG | JPEG2000 | H. 264 | DPCM H. 264 |
|---|---|---|---|---|
| Lena | 435 | 435 | 421 | 364 |
| F16 | 378 | 369 | 362 | 303 |
| Baboon | 592 | 578 | 759 | 680 |
| Peppers | 456 | 473 | 497 | 418 |
| Goldhill | 420 | 389 | 396 | 321 |
| Barbara | 442 | 378 | 448 | 335 |
| House | 408 | 404 | 464 | 360 |
| Peppers2 | 329 | 290 | 381 | 237 |
| Oldmill | 505 | 466 | 488 | 449 |
| Frymire | 386 | 463 | 697 | 405 |
| Average | 424 | 435 | 491 | 387 |
| Compression ratio | 1.81 | 1.77 | 1.56 | 2.00 |

DPCM-BASED ENCODER, DECODER, ENCODING METHOD AND DECODING METHOD

This application claims the benefit of Taiwan application Serial No. 98100421, filed Jan. 7, 2009, the subject matter of which is incorporated herein by reference.

BACKGROUND OF THE INVENTION

1. Field of the Invention

The invention relates to an encoder, a decoder, an encoding method and a decoding method.

2. Description of the Related technology

Generally speaking, lossless image compression technological trends may be classified into two kinds. The first kind of lossless image compression technology, such as JPEG-LS, H.264-LS, AIC or DPCM-H.264-LS, does not include the frequency transform and quantization. The second kind of lossless image compression technology, such as JPEG2000-LS or HD photo, includes the frequency transform and quantization, and may be applied to the lossy and lossless image compression technologies simultaneously.

The lossless image compression technology widely used in the digital archive and the medical image includes JPEG-LS and JPEG2000-LS, which are too old. Although the compression performance of JPEG-LS is far higher than that of JPEG2000-LS, JPEG-LS cannot be simultaneously applied to the lossy image compression in the same encoder. In addition, the application popularization of JPEG2000 is extremely low. Compared with the lossless compression performance, the compression efficiency of JPEG2000-LS and H.264-LS is far lower than that of DPCM-based H.264-LS. However, DPCM-based H.264-LS cannot be applied to the lossy image compression technology. Although the lossless image compression technology is added to the newest H.264 lossy image compression technology, the performance of the added lossless image compression technology is relatively lower than that of each of JPEG-LS and JPEG2000-LS. Although Microsoft has published the image compression technology HD Photo capable of supporting the lossy and lossless conditions, the compression ratio of the lossless image is also far lower than that of each of JPEG-LS and JPEG2000-LS.

Therefore, it is an important issue in the current image compression to provide the universal encoding technology having the high compression performance and capable of supporting the lossy and lossless conditions simultaneously.

SUMMARY OF THE INVENTION

According to a first exemplary embodiment of the present invention, an encoder including a reversible color transform module, a difference pulse code modulation (DPCM) intra prediction module, a quantization module, a reversible frequency transform module and an entropy coding module is provided. The reversible color transform module performs a reversible color transform to output a transformed video signal according to an input video signal. The DPCM intra prediction module performs a DPCM intra prediction to output a least residual according to the transformed video signal. The least residual is selected from a plurality of residuals generated in correspondence to a plurality of intra prediction direction modes. The quantization module performs a quantization operation to output a quantization coefficient according to the least residual. The reversible frequency transform module performs a reversible frequency transform to output a frequency coefficient according to the quantization coefficient. The entropy coding module performs entropy coding to output a compression bit stream according to the frequency coefficient.

According to a second exemplary embodiment of the present invention, an encoding method is provided. The method includes the steps of: performing a reversible color transform to output a transformed video signal according to an input video signal; performing a difference pulse code modulation (DPCM) intra prediction to output a least residual according to the transformed video signal, wherein the least residual is selected from a plurality of residuals generated in correspondence to a plurality of intra prediction direction modes; performing a quantization operation to output a quantization coefficient according to the least residual; performing a reversible frequency transform to output a frequency coefficient according to the quantization coefficient; and performing an entropy coding operation to output a compression bit stream according to the frequency coefficient.

According to a third exemplary embodiment of the present invention, a decoder is provided. The decoder includes an entropy decoding module, an inverse reversible frequency transform module, an inverse quantization module, a compensation module and an inverse reversible color transform module. The entropy decoding module performs entropy decoding to output a frequency coefficient according to an input compression bit stream. The inverse reversible frequency transform module performs an inverse reversible frequency transform to output a quantization coefficient according to the frequency coefficient. The inverse quantization module performs an inverse quantization operation to output a least residual according to the quantization coefficient. The compensation module performs a difference pulse code modulation (DPCM) intra compensation to output a transformed video signal according to neighboring compensated video signals and the least residual. The least residual corresponds to one of a plurality of residuals generated by an encoder in a plurality of intra prediction direction modes. The inverse reversible color transform module performs an inverse reversible color transform according to the transformed video signal to output an input video signal.

According to a fourth exemplary embodiment of the present invention, a decoding method is provided. The decoding method includes: performing entropy decoding to output a frequency coefficient according to an input compression bit stream; performing an inverse reversible frequency transform to output a quantization coefficient according to the frequency coefficient; performing an inverse quantization operation to output a least residual according to the quantization coefficient; performing an intra compensation to output a transformed video signal according to neighboring compensated video signals and the least residual, wherein the least residual corresponds to one of a plurality of residuals generated by an encoder in a plurality of intra prediction direction modes; and performing an inverse reversible color transform to output an input video signal according to the transformed video signal.

The invention will become apparent from the following detailed description of the preferred but non-limiting embodiments. The following description is made with reference to the accompanying drawings.

BRIEF DESCRIPTION OF THE DRAWINGS

FIG. 3 is a schematic illustration showing a prediction direction mode.

FIG. 4 is a schematic illustration showing the prediction direction mode.

FIG. 5 is a schematic illustration showing the prediction direction mode.

FIG. 12 is a schematic illustration showing the prediction direction mode.

FIG. 13 is a schematic illustration showing pixel symbols.

FIG. 14 is a schematic illustration showing a horizontal direction residual.

FIG. 15 is a schematic illustration showing a vertical direction residual.

FIG. 16 is a schematic illustration showing a 135-degree direction residual.

FIG. 17 is a schematic illustration showing the actual pixel value distribution.

FIG. 18 shows a residual obtained after executing the intra prediction in the H264 horizontal direction.

FIG. 19 shows a residual after executing the DPCM intra prediction.

DETAILED DESCRIPTION OF THE INVENTION

Figure 1:
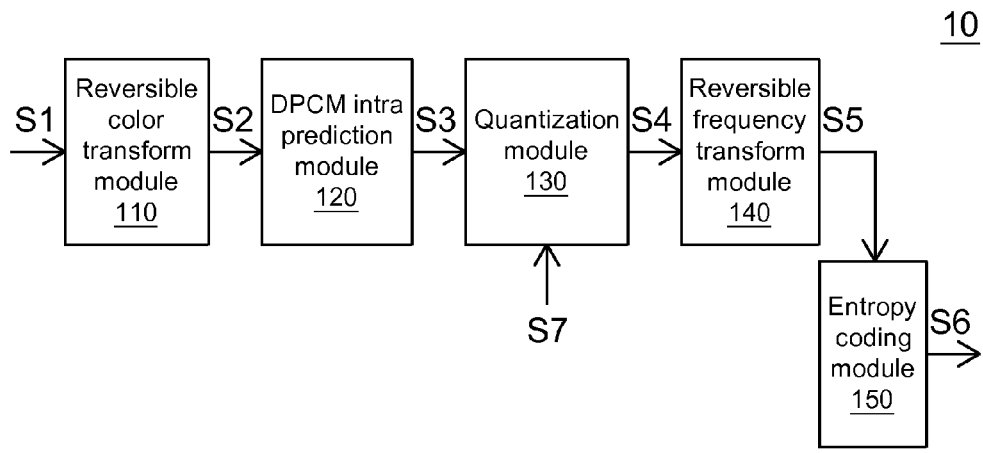
FIG. 1 is a block diagram showing an image encoder according to an embodiment of the invention.
Figure 2:
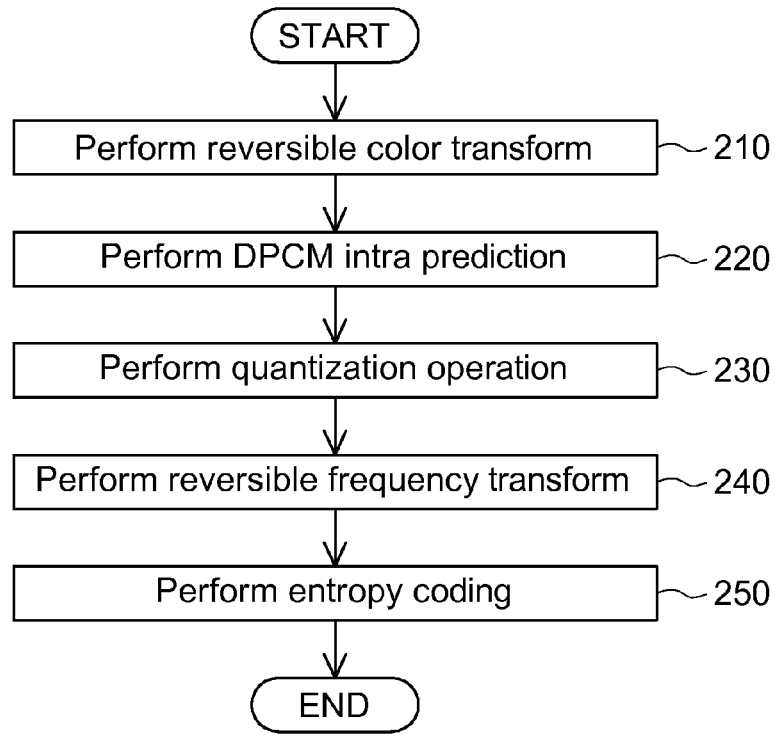
FIG. 2 is a flow chart showing an image encoding method according to an embodiment of the invention.

FIG. 1 is a block diagram showing an image encoder 10 according to an embodiment of the invention. FIG. 2 is a flow chart showing an image encoding method according to an embodiment of the invention. Referring to FIGS. 1 and 2, the image encoder 10 includes a reversible color transform module 110, a difference pulse code modulation (DPCM) intra prediction module 120, a quantization module 130, a reversible frequency transform module 140 and an entropy coding module 150. The image encoding method includes the following steps.

First, as shown in step 210, the reversible color transform module 110 performs a reversible color transform to output a transformed video signal S2 according to an input video signal S1. The video signal S1 may be a RGB signal, while the transformed video signal S2 includes a YUV signal or a YCbCr signal having one gray-scale image and two color images. Next, as shown in step 220, the DPCM intra prediction module 120 performs a DPCM intra prediction according to the transformed video signal S2, and selects a least residual S3 from residuals of a plurality of intra prediction direction modes.

Next, as shown in step 230, the quantization module 130 performs a quantization operation to output a quantization coefficient S4 according to the least residual S3. Then, as shown in step 240, the reversible frequency transform module 140 performs a reversible frequency transform to output a frequency coefficient S5 according to the quantization coefficient S4. The reversible frequency transform module 140 may adaptively select whether to perform the reversible frequency transform on the quantization coefficient S4, and the quantization coefficient S4 determines to perform the reversible frequency transform according to the condition that the collected transformed energy is lower than that when the transform is not performed. Finally, as shown in step 250, the entropy coding module 150 performs entropy coding to output a compression bit stream S6 according to the frequency coefficient S5. The quantization module 130 may be adaptively controlled by a quantization parameter S7 so that the entropy coding module 150 may selectively output a lossy compression bit stream, a near lossless compression bit stream or a lossless compression bit stream.

In brief, the image encoder 10 generally pertains to universal encoding capable of supporting lossy and lossless conditions simultaneously. For example, the lossy compression ability of the image encoder 10 is better than that of each of H.264, JPEG2000, AIC, HD Photo and JPEG, and the lossless compression ability of the image encoder 10 is better than that of each of DPCM_H.264-LS, JPEG-LS, JPEG2000-LS, HD Photo, H.264-LS and AIC. Furthermore, the image encoder 10 can provide the lossy compression bit stream, the near lossless compression bit stream or the lossless compression bit stream by adjusting the quantization quality parameter under the same encoding architecture according to different image qualities. Furthermore, the intra prediction wastes the longest time in the H.264 lossy image compression encoder, and the image encoder 10 needs not to perform the discrete cosine transform (DCT) and the inverse discrete cosine transform (IDCT) operations to obtain the neighboring prediction coefficients needed for the intra prediction, so that it can be further applied to an embedded system.

FIGS. 3 to 12 are schematic illustrations showing prediction direction modes. In detail, the prediction direction modes include a plurality of linear direction modes and a rotation direction mode. In order to make the invention be easily understood, ten prediction direction modes are listed in FIGS. 3 to 12. However, the invention is not limited thereto, and the number of the prediction direction modes may be increased or decreased according to the actual application requirement. FIGS. 3 to 12 respectively show prediction direction modes 0 to 9.

Figure 6:
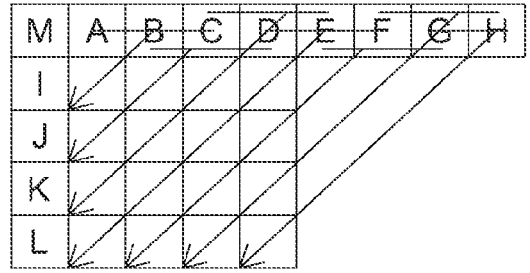
FIG. 6 is a schematic illustration showing the prediction direction mode.
Figure 7:
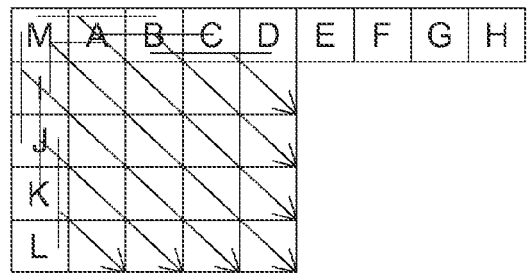
FIG. 7 is a schematic illustration showing the prediction direction mode.

The prediction direction mode 0 in FIG. 3 is vertical; the prediction direction mode 1 in FIG. 4 is horizontal; the prediction direction mode 2 in FIG. 5 is mean; the prediction direction mode 3 in FIG. 6 is diagonal down-left; and the prediction direction mode 4 in FIG. 7 is diagonal down-right.

Figure 8:
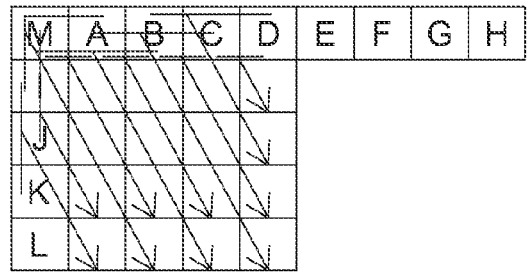
FIG. 8 is a schematic illustration showing the prediction direction mode.
Figure 9:
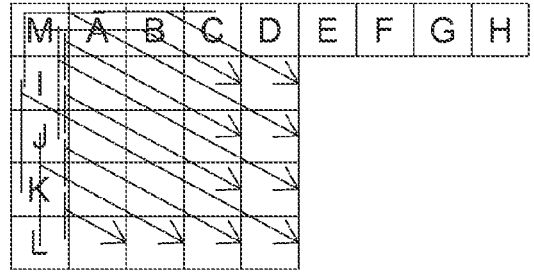
FIG. 9 is a schematic illustration showing the prediction direction mode.
Figure 10:
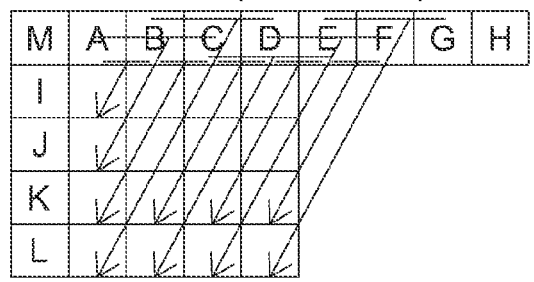
FIG. 10 is a schematic illustration showing the prediction direction mode.
Figure 11:
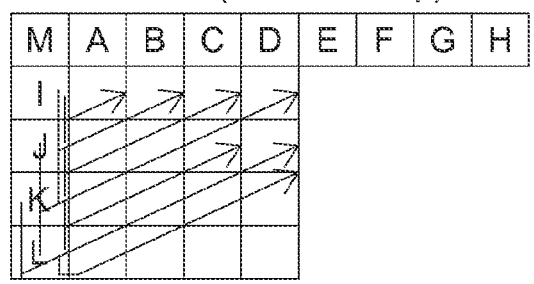
FIG. 11 is a schematic illustration showing the prediction direction mode.
Figures 12, 13, 14, 15:
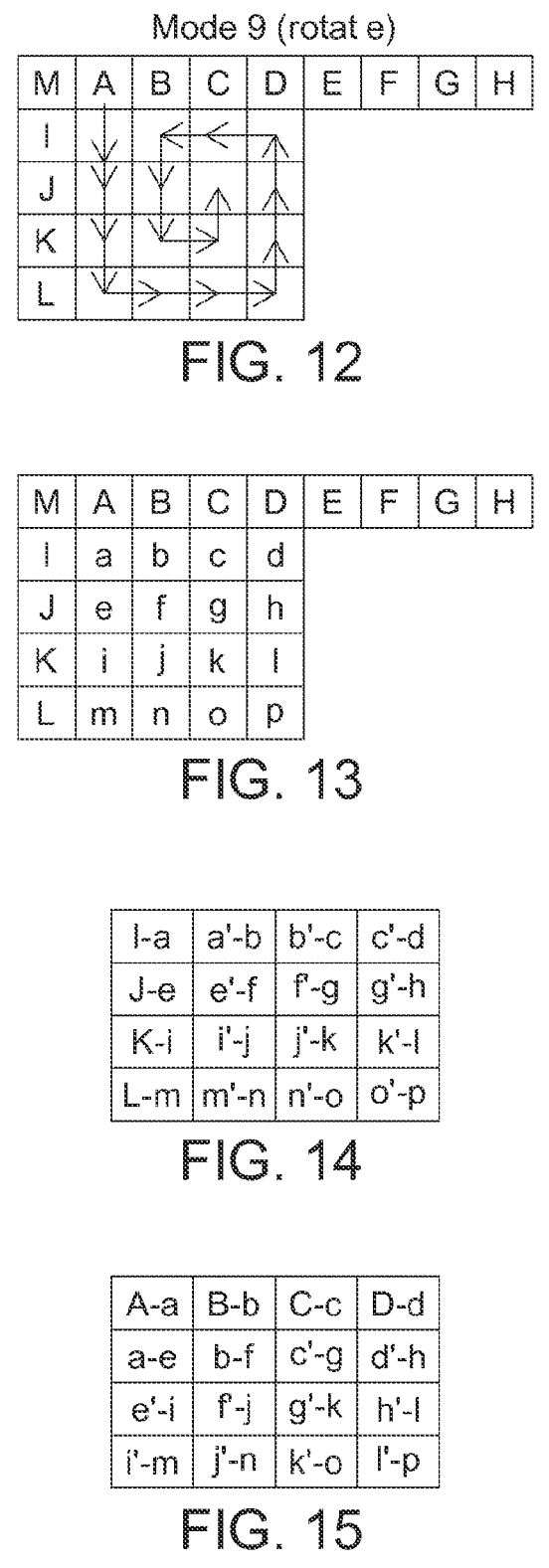

The prediction direction mode 5 in FIG. 8 is vertical-right; the prediction direction mode 6 in FIG. 9 is horizontal-down; the prediction direction mode 7 in FIG. 10 is vertical-left; the prediction direction mode 8 in FIG. 11 is horizontal-up; and the prediction direction mode 9 in FIG. 12 is to rotate from outside to inside. It is to be specified that some speckle-like residuals cannot be eliminated owing to the mode 0 to the mode 8, and the DPCM intra prediction module 120 of FIG. 1 can eliminate the speckle-like residuals through the mode 9 and further increase the compression ratio.

FIG. 13 is a schematic illustration showing pixel symbols. FIG. 14 is a schematic illustration showing a horizontal direction residual. FIG. 15 is a schematic illustration showing a vertical direction residual. FIG. 16 is a schematic illustration showing a 135-degree direction residual. As shown in FIGS. 13 to 16, the reference prediction values generated by the lossless and lossy DPCM intra prediction are different. The reference prediction value generated by the lossy DPCM intra prediction method is quantized and then inversely quantized to obtain a coefficient serving as the reference prediction value of the next coefficient. The prediction direction modes have different reference prediction values generated by different prediction directions. Finally, the least residual is selected from all the modes.

In FIGS. 13 to 16, the symbols a to p are initial pixel positions, the symbols A to M are the reference prediction values of the neighboring blocks, the symbols a' to p' are the reference prediction values obtained after the neighboring pixels are quantized and then inversely quantized, and Q is a quantization zone. In FIG. 14, the reference prediction values obtained after the neighboring pixels in the horizontal direction are quantized and then inversely quantized may be derived according to the following Equations (1) to (3) and the analogized equations:

$$a'=I-\lfloor (I-a)/Q \rfloor \times Q \quad (1)$$

wherein the symbol $\lfloor \; \rfloor$ represents a minimum integer obtained after being divided by a predetermined value.

$$b'=a'-\lfloor (a'-b)/Q \rfloor \times Q \quad (2)$$

$$c'=b'-\lfloor (b'-c)/Q \rfloor \times Q \quad (3)$$

The other equations of computing the prediction values of the other neighboring pixels may be analogized according to Equations (1) to (3) so that the other horizontal direction residuals may be calculated. The horizontal direction residuals corresponding to Equations (1) to (3) are sequentially a'-b, b'-c and c'-d, and so on. It is to be specified that the division by the quantization zone Q is to perform a quantization operation, and the multiplication by the quantization zone Q is to perform an inverse quantization operation. After the quantizations through different quantization zones, quantization errors are correspondingly and inevitably generated after the inverse quantization.

In addition, the neighboring pixels in the vertical direction of FIG. 15 are quantized and then inversely quantized to obtain the reference prediction values, which may be obtained according to the following Equations (4) to (6) and the analogized equations thereof:

$$a'=A-\lfloor (A-a)/Q \rfloor \times Q \quad (4)$$

$$e'=a'-\lfloor (a'-e)/Q \rfloor \times Q \quad (5)$$

$$i'=e'-\lfloor (e'-i)/Q \rfloor \times Q \quad (6)$$

The equations of computing the reference prediction values of the other neighboring pixels may be analogized according to Equations (4) to (6) so that the other reference prediction values in the other vertical direction may be computed. The vertical direction residuals corresponding to Equations (3) to (6) are sequentially a'-e, e'-i and i'-m, and so on.

Furthermore, the neighboring pixels in the 135-degree direction of FIG. 16 are quantized and then inversely quantized to obtain the reference prediction values, which may be obtained according to the following Equations (7) to (9) and the analogized equations thereof:

$$a'=M-\lfloor (M-a)/Q \rfloor \times Q \quad (7)$$

$$f'=a'-\lfloor (a'-f)/Q \rfloor \times Q \quad (8)$$

$$k'=e'-\lfloor (e'-k)/Q \rfloor \times Q \quad (9)$$

The equations of computing the reference prediction values of the other neighboring pixels may be analogized according to Equations (7) to (9) so that the other reference prediction values in the 135-degree direction may be computed. The 135-degree direction residuals corresponding to Equations (7) to (9) are sequentially a'-f, f'-k and k'-p, and so on.

FIG. 17 is a schematic illustration showing the actual pixel value distribution. FIG. 18 shows a residual obtained after the intra prediction in the H.264 horizontal direction. FIG. 19 shows a residual after the DPCM intra prediction. When the quantization zone Q is equal to 3, the residuals obtained in the horizontal direction of the DPCM intra prediction are listed in FIG. 19, and the residuals obtained in the horizontal direction of H.264 are listed in FIG. 18. Comparing FIG. 18 with FIG. 19, it is clearly obtained that the residuals obtained in the horizontal direction after the DPCM intra prediction are indeed smaller than the residuals obtained in the horizontal direction of H.264.

Figure 20:
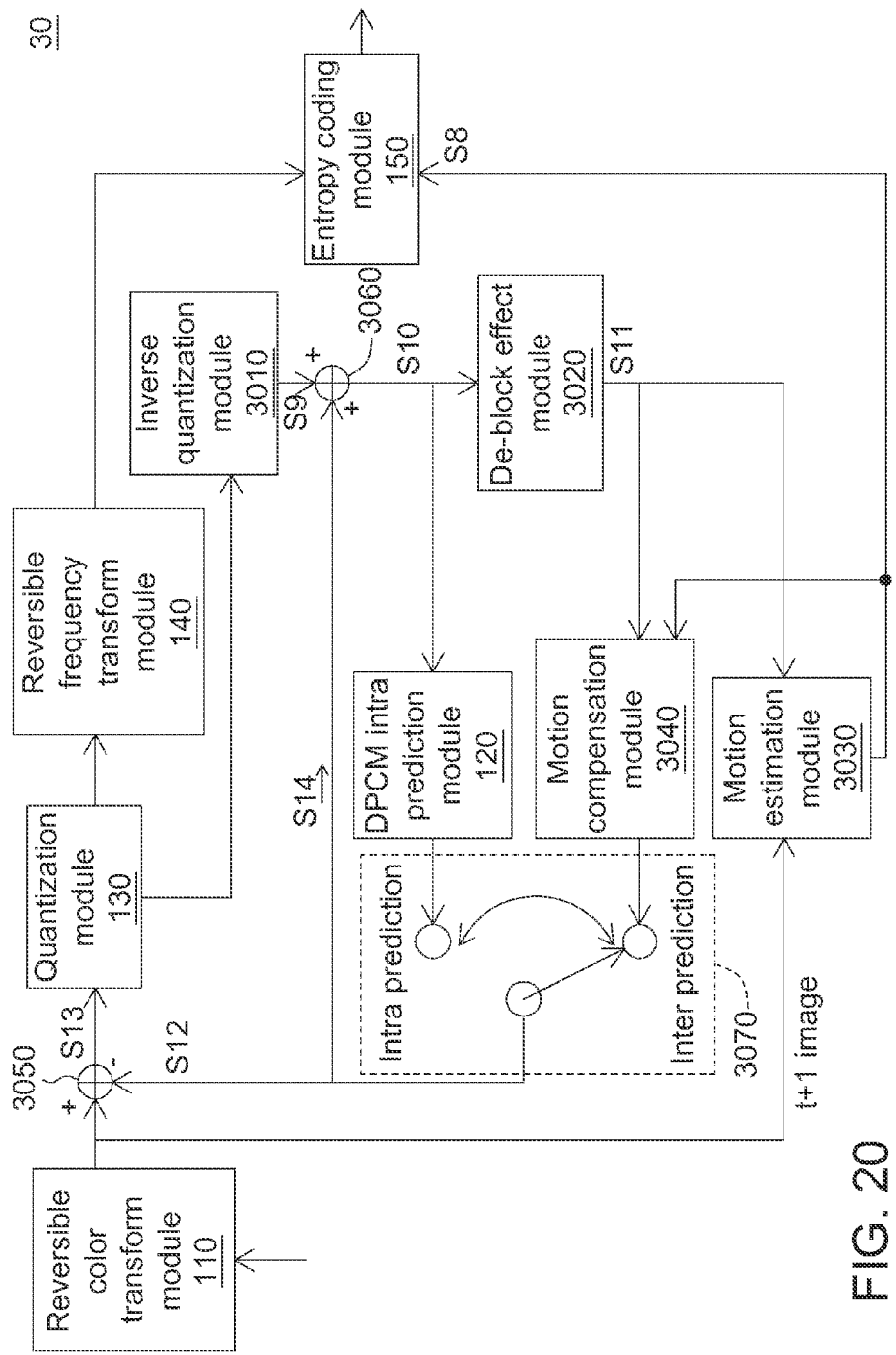
FIG. 20 is a block diagram showing a video encoder according to an embodiment of the invention.

FIG. 20 is a block diagram showing a video encoder 30 according to an embodiment of the invention. The video encoder 30 is obtained after the image encoder 10 is extended. In addition to the reversible color transform module 110, the DPCM intra prediction module 120, the quantization module 130, the reversible frequency transform module 140 and the entropy coding module 150, the video encoder 30 further includes an inverse quantization module 3010, a de-block effect module 3020, a motion estimation module 3030, a motion compensation module 3040, an operating unit 3050, an operating unit 3060 and a switch unit 3070.

When the intra prediction (t image) is performed, it means that the elimination of the redundant amount between pixels of a single image has to be performed, and the switch unit 3070 switches to the intra prediction. That is, the switch unit 3070 is electrically connected to the operating unit 3050 and the DPCM intra prediction module 120. When the DPCM intra prediction module 120 is predicting the least residual, the quantization module 130 and the inverse quantization module 3010 are simultaneously adopted to obtain the reference prediction values (a' to o') for each intra prediction direction and the residuals having quantization errors. At last, the quantization module 130 outputs the quantization coefficient S4 obtained in the optimum prediction direction of the DPCM intra prediction module 120 after the least residual quantization. Then, the reversible frequency transform module 140 processes the quantization coefficient and outputs the frequency coefficient S5. The frequency coefficient S5 is further processed by the entropy coding module, which then outputs the compression bit stream S6 after the t image compression.

Then, when the t+1 image S2 is continuously encoded, it means that the redundant amount between two images has to be eliminated, and the switch unit 3070 is switched to the inter prediction. That is, the switch unit 3070 is electrically connected to the operating unit 3050 and the motion compensation module 3040. The inverse quantization module 3010 correspondingly outputs the least residual S9 with the quantization error according to the quantization coefficient outputted from the quantization module 130 at the t image time. The operating unit 3060 summates the direction information S14, predicted by the DPCM intra prediction module 120, and the least residual compensation, outputted from the inverse quantization module 3010, together to obtain the block effect image S10 with the quantization error. The deblock effect module 3020 smoothens the block effect image S10 having the quantization error to obtain the output image S11 (similar to the output image of the decoder), which can be visually accepted. The motion estimation module 3030 processes the output image S11 and the t+1 image and thus outputs a motion vector S8. The motion vector S8 is directly outputted to the entropy coding module 150, which encodes the motion vector S8. The motion compensation module 3040 processes the motion vector S8 and the output image S11 and thus outputs a motion compensation image S12. The motion compensation image S12 is switched to the inter prediction through the switch unit 3070, and then a subtraction between the motion compensation image S12 and the t+1 image is made to obtain a difference image S13. The difference image S13 is then processed by the DPCM intra prediction module 120, the quantization module 130 and the inverse quantization module 3010 so that the quantization coefficient S4 of the t+1 image is obtained. This quantization coefficient is further processed by the reversible frequency transform module 140 so that the frequency coefficient S5 is outputted. The frequency coefficient is further processed by the entropy coding module so that the compression bit stream S6 after the t+1 image is compressed is obtained.

When the t+2 image S2 is continuously encoded, it means that the redundant amount between two images has to be continuously eliminated. The switch unit 3070 continues to switch to the inter prediction, and the inverse quantization module 3010 correspondingly outputs the least residual S9 having the quantization error according to the quantization coefficient outputted from the quantization module 130 at the t+1 image time, and so on.

Figure 21:
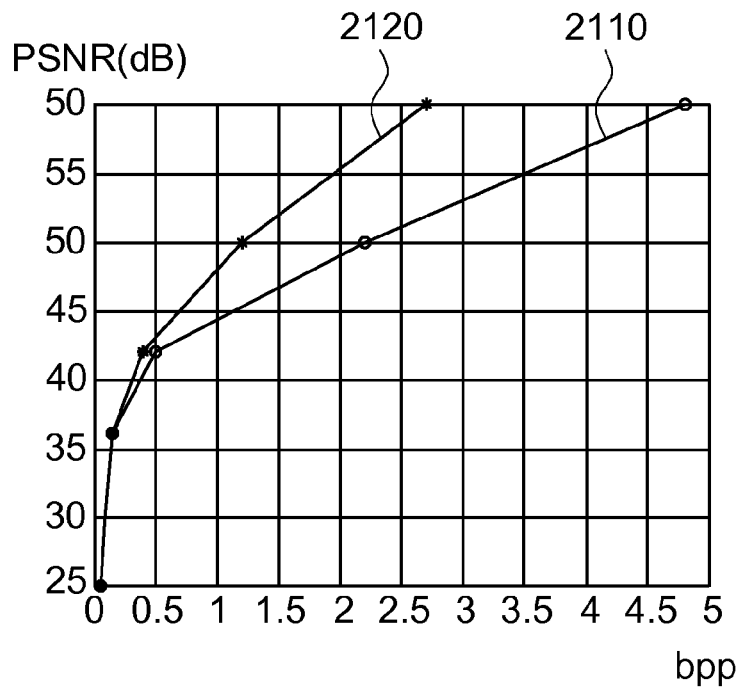
FIG. 21 shows static compression performance curves of H.264 and an embodiment of the invention.
Figure 22:
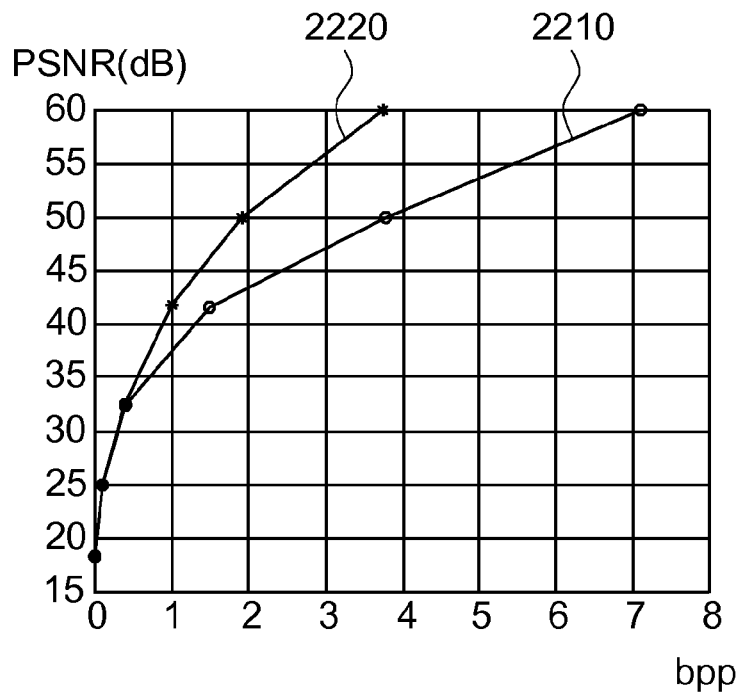
FIG. 22 shows dynamic compression performance curves of H.264 and an embodiment of the invention.

FIG. 21 shows static compression performance curves of H.264 and an embodiment of the invention. FIG. 22 shows dynamic compression performance curves of H.264 and an embodiment of the invention. The entropy coding module 150 shown in FIG. 1 may adopt the embedded block coding with optimized truncation (EBCOT) to replace the context adaptive binary arithmetic coding (CABAC) to obtain the performance curves in FIGS. 21 and 22.

In FIG. 21, the compression performance curve 2110 represents the continuous static image compression performance curve of the peak signal-to-noise ratio (PSNR) to the bit per pixel (bpp) in H.264, and the compression performance curve 2120 represents the continuous static image compression performance curve of the PSNR to the bpp in the embodiment of the invention. In FIG. 22, the compression performance curve 2210 represents the continuous static image compression performance curve of the PSNR to the bpp in H.264, and the compression performance curve 2220 represents the continuous static image compression performance curve of the PSNR to the bpp in the embodiment of the invention. As shown in FIGS. 21 and 22, it is obtained that at least 4 dB of bit rate in average may be increased when the compression ratio is 1 dpp in the embodiment of the invention.

Figure 23:
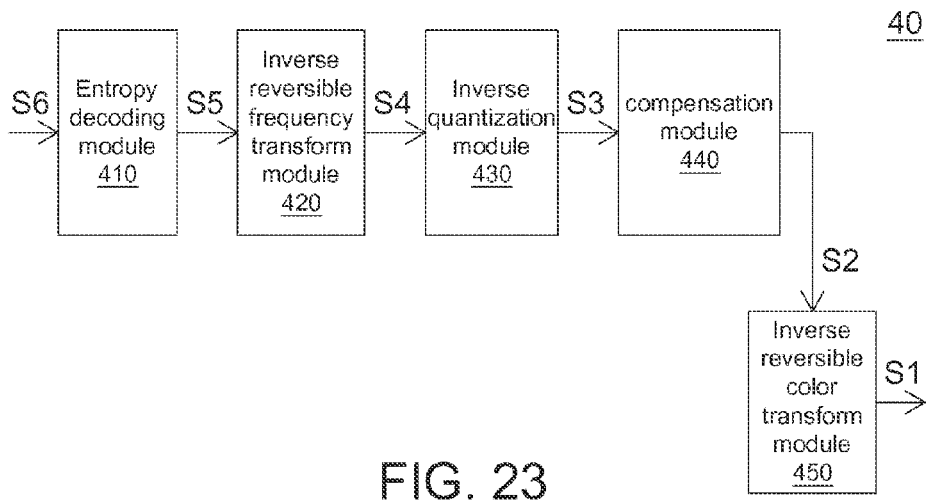
FIG. 23 shows an image decoder according to an embodiment of the invention.
Figure 24:
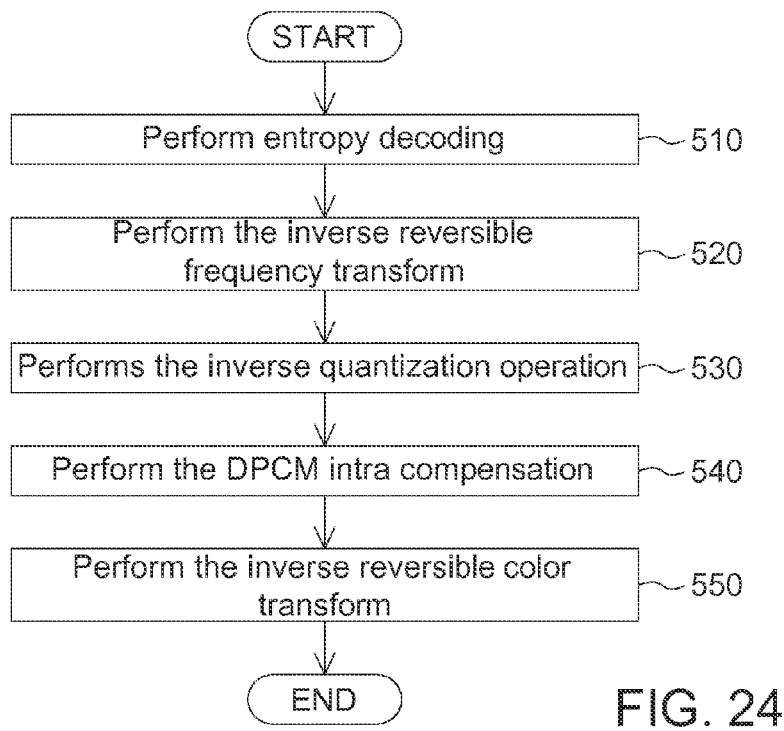
FIG. 24 is a flow chart showing an image decoding method according to an embodiment of the invention.

FIG. 23 shows an image decoder 40 according to an embodiment of the invention. FIG. 24 is a flow chart showing an image decoding method according to an embodiment of the invention. Referring to FIGS. 23 to 24, the image decoder 40 includes an entropy decoding module 410, an inverse reversible frequency transform module 420, an inverse quantization module 430, a compensation module 440 and an inverse reversible color transform module 450. The image decoding method includes the following steps.

As shown in step 510, the entropy decoding module 410 performs entropy decoding to output the frequency coefficient S5 according to the compression bit stream S6. If the original image is only processed by the entropy decoding of the entropy coding module 150 of FIG. 1 and the entropy coding operation of the entropy decoding module 410, then the output should still be the original image because the entropy coding pertains to the lossless compression technology.

As shown in step 520, the inverse reversible frequency transform module 420 performs the inverse reversible frequency transform to output the quantization coefficient S4 according to the frequency coefficient S5. If the original image is only processed by the reversible frequency transform of the reversible frequency transform module 140 of FIG. 1 and the inverse reversible frequency transform operation of the inverse reversible frequency transform module 420, then the output should still be the original image because the perfect reconstruction is obtained after the reversible frequency transform operation.

As shown in step 530, the inverse quantization module 430 performs the inverse quantization operation to output the least residual S3 according to the quantization coefficient S4. If the original image is only processed by the quantization operation of the quantization module 130 of FIG. 1 and the inverse quantization operation of the inverse quantization module 430, then the output should be determined to be still the original image or the lossy image having the quantization error according to the quantization parameter S7.

As shown in step 540, the compensation module 440 performs the DPCM intra compensation to output the transformed video signal S2 according to the least residual S3. If the original image is only processed by the DPCM intra prediction of the DPCM intra prediction module 120 of FIG. 1 and the DPCM intra compensation of the compensation module 440, then the output should still be the original image.

As shown in step 550, the inverse reversible color transform module 450 performs the inverse reversible color transform to output the input video signal S1 according to the transformed video signal S2. If the original image is only processed by the reversible color transform of the reversible color transform module 110 of FIG. 1 and the inverse reversible color transform of the inverse reversible color transform module 450, then the output should still be the original image. This is because the perfect reconstruction is obtained after the reversible color transform operation.

Figures 25, 26:
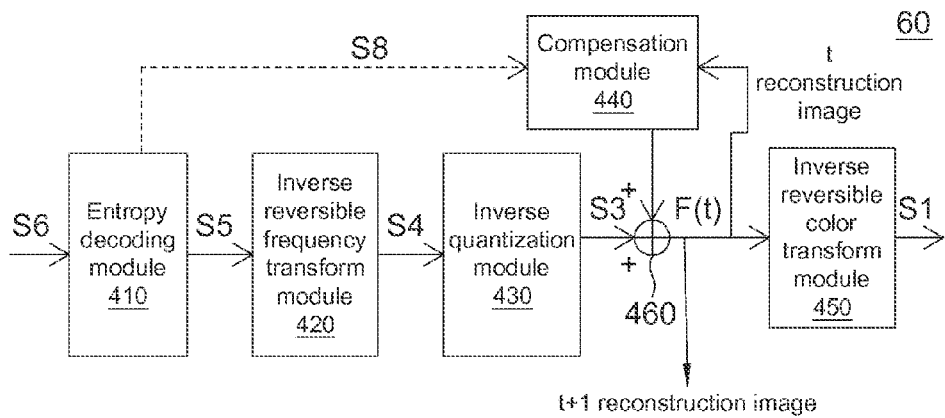
FIG. 25 is a block diagram showing a video decoder according to an embodiment of the invention.
FIG. 26 is a schematic illustration showing the comparison between four lossless compression technologies.

FIG. 25 is a block diagram showing a video decoder 60 according to an embodiment of the invention. Referring to FIG. 25, the video decoder 60 is obtained after the image decoder 40 is further extended. In addition to the entropy decoding module 410, the inverse reversible frequency transform module 420, the inverse quantization module 430, the compensation module 440 and the inverse reversible color transform module 450, the image decoder 40 further includes an operating unit 460. As for the intra compensation, the compensation module 440 performs the addition and compensation through the operating unit 460 according to the DPCM intra compensation direction, the neighboring decoded reference prediction values and the least residual obtained after the inverse quantization module 430 performs the inverse quantization so that the t reconstruction image is obtained. As for the inter-frame compensation, the compensation module 440 performs the addition and compensation through the operating unit 460 according to the t reconstruction image and the motion vector S8 obtained after the decoding of the entropy decoding module 410 so that the compensated t+1 reconstruction image is outputted. The t and t+1 reconstruction images are processed by the inverse reversible color transform module 450, which then outputs the original input video signal without the quantization error or the video signal S1 with the quantization error.

The encoder, the decoder, the encoding method and the decoding method according to the embodiments of the invention have the better lossy compression ability than H.264, JPEG2000, AIC, HD Photo and JPEG, and the better lossless compression ability than DPCM_H.264, JPEG, JPEG2000, HD Photo, H.264 and AIC. In addition, the embodiments of the invention can further provide the lossy compression bit stream, the near lossless compression bit stream or the lossless compression bit stream in response to different image qualities under the same encoding architecture. Furthermore, performing the intra prediction wastes the longest time in the image compression. The embodiments of the invention need not to simultaneously perform the discrete cosine transform (DCT) and the inverse discrete cosine transform (IDCT) to obtain the least residual, and can thus be further applied to the embedded system.

FIG. 26 is a schematic illustration showing the comparison between four lossless compression technologies. As shown in FIG. 26, the lossless compression technology includes JPEG, JPEG2000, H.264 and DPCM H.264. The compression ratios of JPEG, JPEG2000, H.264 and DPCM H.264 are respectively 1.81, 1.77, 1.56 and 2.00. So, the DPCM H.264 has the highest compression ratio among the four lossless compression technologies. The embodiment can adopt the entropy coding operation to make the compression ratio be higher than that of DPCM H.264.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An encoder, comprising:
    a reversible color transform module for performing a reversible color transform to output a transformed video signal according to an input video signal;
    a difference pulse code modulation (DPCM) intra prediction module for performing a DPCM intra prediction to output a least residual according to the transformed video signal, wherein the least residual is selected from a plurality of residuals generated in correspondence to a plurality of intra prediction direction modes, wherein the prediction direction modes comprise a plurality of linear direction modes and a rotation direction mode;
    a quantization module for performing a quantization operation on the least residual from the DPCM intra prediction module to output a quantization coefficient;
    a reversible frequency transform module for performing a reversible frequency transform on the quantization coefficient outputted by the quantization module to output a frequency coefficient; and
    an entropy coding module for performing entropy coding to output a compression bit stream according to the frequency coefficient.

2. The encoder according to claim 1, further comprising:
    an inverse quantization module for performing an inverse quantization operation to output the least residual according to the quantization coefficient.

3. The encoder according to claim 1, wherein the quantization module is controlled by a quantization parameter such that the entropy coding module selectively outputs a lossy compression bit stream, a near lossless compression bit stream or a lossless compression bit stream.

4. The encoder according to claim 1, further comprising:
    a de-block effect module for processing a block effect image with a quantization error into an output image;
    a motion estimation module for outputting a motion vector to the entropy coding module according to the output image and a next to-be-encoded image; and
    a motion compensation module for performing a motion compensation to output a motion compensation image according to the motion vector and the output image.

5. The encoder according to claim 4, further comprising:
    an operating unit for subtracting an original image of the transformed video signal from the motion compensation image to output a difference image to the quantization module.

6. The encoder according to claim 5, further comprising:
    a switch unit for selectively electrically connecting the operating unit to the DPCM intra prediction module or the motion compensation module.

7. The encoder according to claim 6, wherein when the DPCM intra prediction is performed, the switch unit is electrically connected to the operating unit and the DPCM intra prediction module.

8. The encoder according to claim 6, wherein when an inter prediction is performed, the switch unit is electrically connected to the operating unit and the motion compensation module.

9. The encoder according to claim 4, further comprising:
    an operating unit for adding the least residual to the motion compensation image to output a compensated image to the DPCM intra prediction module.

10. The encoder according to claim 1, wherein the rotation direction mode is to rotate from outside to inside.

11. The encoder according to claim 1, wherein the quantization coefficient determines to perform the reversible frequency transform according to a condition that energy collected after the reversible frequency transform is lower than that collected when the reversible frequency transform is not performed.

12. An encoding method, comprising the steps of:
    performing a reversible color transform to output a transformed video signal according to an input video signal;
    performing a difference pulse code modulation (DPCM) intra prediction to output a least residual according to the transformed video signal, wherein the least residual is selected from a plurality of residuals generated in correspondence to a plurality of intra prediction direction modes, wherein the prediction direction modes comprise a plurality of linear direction modes and a rotation direction mode;
    performing a quantization operation on the least residual to output a quantization coefficient;
    performing a reversible frequency transform on the quantization coefficient to output a frequency coefficient; and
    performing an entropy coding operation to output a compression bit stream according to the frequency coefficient.

13. The method according to claim 12, further comprising the step of:
    performing an inverse quantization operation to output the least residual according to the quantization coefficient.

14. The method according to claim 12, further comprising the steps of:
    processing a block effect image with a quantization error into an output image;

outputting a motion vector according to the output image and a next to-be-encoded image; and performing a motion compensation to output a motion compensation image according to the motion vector and the output image.

15. The method according to claim 14, further comprising the steps of:

subtracting an original image of the transformed video signal from the motion compensation image to output a difference image; and performing the quantization operation, the reversible frequency transform and the entropy coding operation according to the difference image.

16. The method according to claim 14, further comprising the step of:

adding the least residual to the motion compensation image to output a compensated image.

17. The method according to claim 12, further comprising the step of:

performing a de-block effect operation to reduce a block effect caused when the quantization operation is performed.

18. The method according to claim 12, wherein in the step of performing the reversible frequency transform, the quantization coefficient determines to perform the reversible frequency transform according to a condition that energy collected after the reversible frequency transform is lower than that collected when the reversible frequency transform is not performed.

19. The method according to claim 12, wherein the rotation direction mode is to rotate from outside to inside.

20. A decoder, comprising:

an entropy decoding module for performing entropy decoding to output a frequency coefficient according to an input compression bit stream;

an inverse reversible frequency transform module for performing an inverse reversible frequency transform on the frequency coefficient to output a quantization coefficient;

an inverse quantization module for performing an inverse quantization operation on the quantization coefficient to output a least residual;

a compensation module for performing a difference pulse code modulation (DPCM) intra compensation to output a transformed video signal according to neighboring compensated video signals and the least residual, wherein the least residual corresponds to one of a plurality of residuals generated by an encoder in a plurality of intra prediction direction modes, wherein the prediction direction modes comprise a plurality of linear direction modes and a rotation direction mode; and an inverse reversible color transform module for performing an inverse reversible color transform according to the transformed video signal to output an input video signal.

21. The decoder according to claim 20, wherein the compensation module further performs a motion compensation operation according to a motion vector.

22. The decoder according to claim 21, wherein the motion vector is obtained by the entropy decoding module, which performs the entropy decoding.

23. A decoding method, comprising:

performing entropy decoding to output a frequency coefficient according to an input compression bit stream;

performing an inverse reversible frequency transform on the frequency coefficient to output a quantization coefficient;

performing an inverse quantization operation on the quantization coefficient to output a least residual;

performing an intra compensation to output a transformed video signal according to neighboring compensated video signals and the least residual, wherein the least residual corresponds to one of a plurality of residuals generated by an encoder in a plurality of intra prediction direction modes, wherein the prediction direction modes comprise a plurality of linear direction modes and a rotation direction mode; and performing an inverse reversible color transform to output an input video signal according to the transformed video signal.

* * * * *